(12) United States Patent
Kanade et al.

(10) Patent No.: US 8,156,538 B2
(45) Date of Patent: Apr. 10, 2012

(54) DISTRIBUTION OF INFORMATION PROTECTION POLICIES TO CLIENT MACHINES

(75) Inventors: Abhijat A. Kanade, Bellevue, WA (US); Rushmi U. Malaviarachchi, Redmond, WA (US); Peter D. Waxman, Seattle, WA (US); Yuhui Zhong, Sammamish, WA (US); Gregory Kostal, Kirkland, WA (US); Scott C. Cottrille, Sammamish, WA (US); Syed A. Mehdi, Raleigh, NC (US); Patricia Priest, Seattle, WA (US); Kumar B. Parambir, Bellevue, WA (US); Li Ren, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 1112 days.

(21) Appl. No.: 11/959,115

(22) Filed: Dec. 18, 2007

(65) Prior Publication Data

US 2009/0158384 A1     Jun. 18, 2009

(51) Int. Cl.
*G06F 17/00* (2006.01)
(52) U.S. Cl. .......................................................... 726/1
(58) Field of Classification Search .................... 726/1
See application file for complete search history.

(56) References Cited

U.S. PATENT DOCUMENTS

| | | | |
|---|---|---|---|
| 6,704,797 B1 | 3/2004 | Fields et al. | |
| 7,024,471 B2 | 4/2006 | George et al. | |
| 7,062,500 B1 | 6/2006 | Hall et al. | |
| 7,110,983 B2 | 9/2006 | Shear et al. | |
| 7,133,845 B1 | 11/2006 | Ginter et al. | |
| 7,165,174 B1 | 1/2007 | Ginter et al. | |
| 2001/0010046 A1 | 7/2001 | Muyres et al. | |
| 2003/0115469 A1 | 6/2003 | Shippy et al. | |
| 2003/0196114 A1 | 10/2003 | Brew et al. | |
| 2004/0243852 A1* | 12/2004 | Rosenstein | 713/201 |
| 2005/0289076 A1 | 12/2005 | Lambert | |
| 2006/0020646 A1* | 1/2006 | Tee et al. | 707/205 |
| 2006/0259813 A1* | 11/2006 | Ushijima | 714/6 |
| 2007/0061870 A1 | 3/2007 | Ting et al. | |
| 2007/0214353 A1 | 9/2007 | Dickinson, III et al. | |

OTHER PUBLICATIONS

Gunawi et al., Improving file system reliability with I/O shepherding, Oct. 2007, ACM New York, NY. SOSP '07 Proceedings of twenty-first ACM SIGOPS sysmposium on Operating systems principles. pp. 1-14.*
Websense, Policy Configuration Guide, "Websense Client Policy Manger", v6.3.1, Apr. 6, 2007,15 pages.
Lumension Security, "Microsoft NAP (Network Access Protection) Program", 2007, 5 pages.
Sterne, Daniel F., et al., "Scalable Access Control for Distributed Object Systems", Proceedings of the 8th USENIX Security Symposium, Aug. 1999,15 pages.

* cited by examiner

*Primary Examiner* — Nabil El Hady
*Assistant Examiner* — Aubrey Wyszynski
(74) *Attorney, Agent, or Firm* — Workman Nydegger

(57) ABSTRACT

One embodiment includes a method which may be practiced in a computing environment where resources are distributed. The method includes acts for obtaining policy information defining restrictions on resources distributed in the computing environment. The method includes sending a request to a server for metadata about one or more resource protection policies at the server. In response to the request, metadata about one or more resource protection polices at the server is received from the server. The metadata from the server is analyzed. Based on analyzing the metadata, one or more resource protection policies stored at the client are updated.

19 Claims, 3 Drawing Sheets

DISTRIBUTION OF INFORMATION PROTECTION POLICIES TO CLIENT MACHINES

BACKGROUND

Background and Relevant Art

Computers and computing systems have affected nearly every aspect of modern living. Computers are generally involved in work, recreation, healthcare, transportation, entertainment, household management, etc.

In computing systems, resources can be transferred within systems and accessed by entities within the computing system using applications. Examples of such resources may include documents, files, or other information. It is often desirable to control how resources are accessed and used within a computing system. For example, it may be desirable to only allow certain actions to be performed on a document depending on various factors. Illustratively, some users may be allowed full access privileges to a document including the ability to open, save, edit, unrestricted forward, print, etc. For other users, it may be desirable to limit privileges, such as for example to read only or some other restriction.

Generally restrictions can be enforced by an application used to access the resource referencing resource protection policies. The applications may be configured to not provide access to a resource without reference to a resource protection policy. Currently two problems exist with managing information protection policies used to protect content. Firstly, most information protection systems need to solve the problem of policy distribution to entities within an a computing system. Often times, policies published by a policy server are distributed to client machines through an out-of-band mechanism. To create this out-of-band distribution mechanism is an additional overhead for enterprise administrators. Also, the distribution mechanism can break at times when the out-of-band mechanism used for template distribution fails to execute as expected.

Secondly, every protection-enabled application may have its own way of locating policies on a client machine because of the lack of a standard way to obtain the policies. For instance, some applications use a registry key that points to a folder that holds the policies. This makes maintenance and use of policies on machines very difficult.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment includes a method which may be practiced in a computing environment where resources are distributed. The method includes acts for obtaining policy information defining restrictions on resources distributed in the computing environment. The method includes sending a request to a server for metadata about resource protection policies at the server. In response to the request, metadata about resource protection polices at the server is received from the server. The metadata from the server is analyzed. Based on analyzing the metadata, resource protection policies stored at the client are updated.

Another embodiment includes a method which may be practiced in a computing environment where resources are distributed. The method includes acts for providing policy information defining restrictions on resources distributed in the computing environment. The method includes receiving a request from a client for metadata about resource protection policies at a server. In response to the request for metadata about resource protection polices at the server, the method includes sending metadata about resource protection polices at the server to the client.

Yet another embodiment includes a method which may be practiced in a computing environment where resources are distributed. The method includes acts for providing policy information defining restrictions on resources distributed in the computing environment. The method includes receiving a request from an application for metadata about resource protection policies at a client. In response to receiving a request from the application for metadata about resource protection policies at the client, metadata about resource protection policies at the client is sent to the application. In response to sending metadata to the application about resource protection policies at the client, a request is received for resource protection policies from the application. In response to receiving a request for resource protection policies from the application, resource protection policies are sent to the application.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments may be implemented to allow greater administrator control and to provide a known location where resource protection policies can be obtained if needed. Further, some embodiments may be implemented where resource protection policies may be cached locally such that applications can obtain resource protection policies without the need to connect to an external server to determine the location of the resource protection policies.

Figure 1:
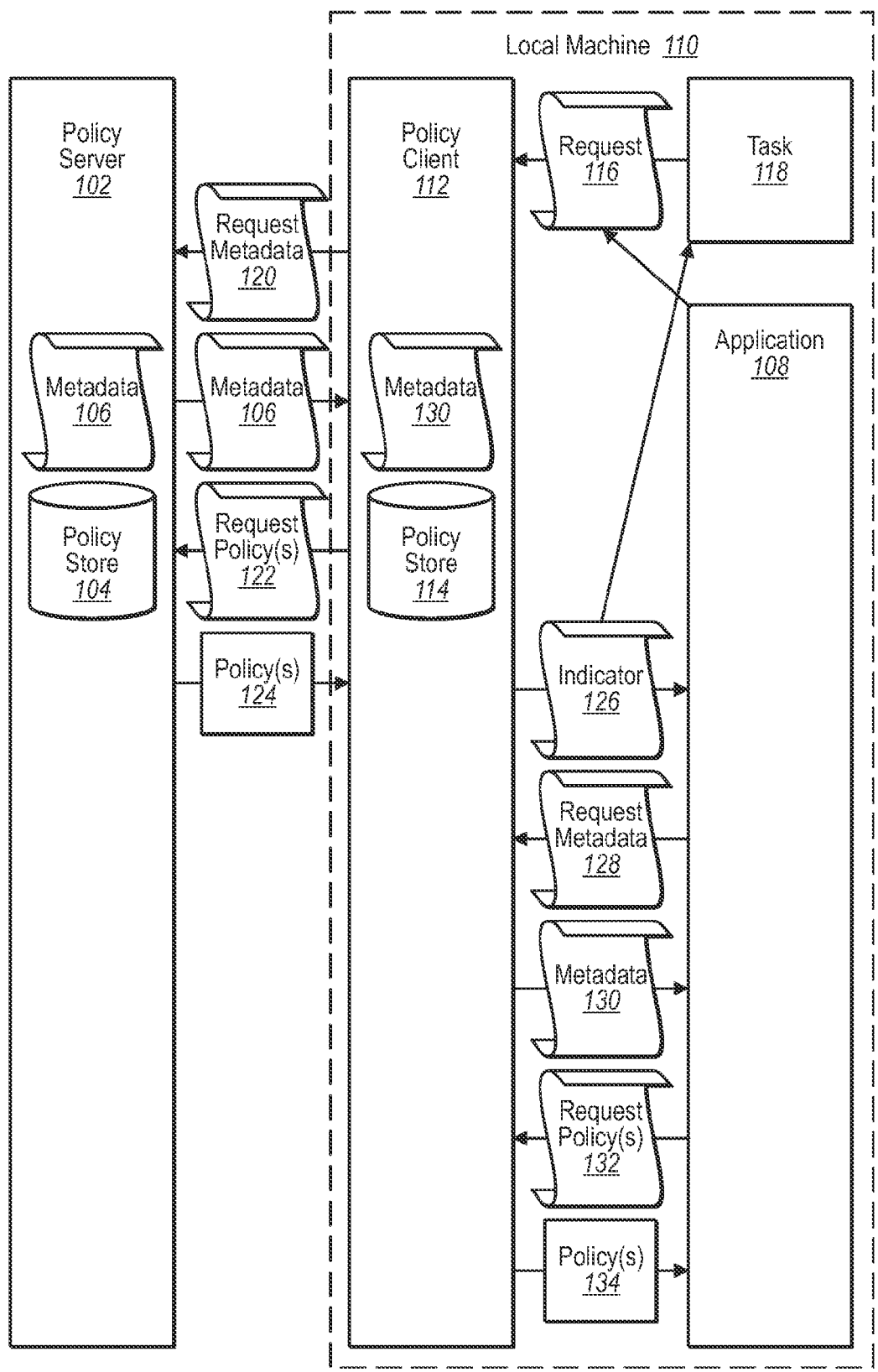
FIG. 1 illustrates a system where a local machine obtains policies from a policy server.

Reference is now made to FIG. 1, which illustrates an example environment where one embodiment may be practiced. FIG. 1 illustrates a policy server 102. The policy server 102 includes a policy store 104 which stores resource protection policies. The policy store 104 may be implemented using any of a number of different stores including databases, files such as XML files containing all policies, directories of files, etc. The resource protection policies include information specifying how resources can be handled. For example, in one example, a resource may be a document. Resource protection policies applicable to the document may specify how the document may be accessed and what actions may be performed on the document. For example, resource protection policies may specify that certain users have full access to the document allowing them read, write, delete, unrestricted forward, print, etc. The resource protection policies may specify that other users have some restrictions on their handling of the document. For example, resource protection policies may specify that a user is allowed to only read a document. Other policies may specify that certain users are not allowed to forward the document to others. Other policies may allow the document to be forwarded, but may restrict to whom the documents may be forwarded. Those of skill in the art will recognize that other policies may be implemented as well. Additionally, resources may be embodied in one or more forms including in documents as illustrated in the examples above, or as other files or data structures.

The restrictions or privileges specified by polices are enforced by policy aware applications, such as application 108 illustrated in FIG. 1. To enforce policies, the applications should have access to the policies to be enforced. The following discussion illustrates one example of how policies can be provided to the applications.

The system illustrated in FIG. 1 illustrates that a local machine 110 includes a policy client 112 and the application 108. The policy client 112 includes functionality for acting as a local repository of policies by storing the policies in a policy store 114.

FIG. 1 illustrates that a request 116 for policy information is sent to the policy client 112. The request 116 may originate from a number of different sources. For example, in one embodiment, the request originates from a task 118. The task 118 may be programmatic code that is configured to cause a request 116 to be generated. In one embodiment, the task 118 is configured to generate a request 116 according to a given interval. In one embodiment, the interval may be specified by the policy server 102. Illustratively, an administrator may be able to configure parameters at the policy server 102, which direct the task 118 to request policy information at a given interval.

In an alternative embodiment, the request 116 may be generated by the policy aware application 108. For example, in one embodiment, the policy aware application 108 may send a request for policy information when needed for administering policy based privileges for a resource.

Notably, embodiments may be implemented where the policy client 112 includes an application programming interface (API) that is accessible by the task 118 or the application 108.

FIG. 1 illustrates that the policy client, in response to the request 116, sends a request for metadata 120. The request for metadata 120 is sent from the policy client 112 to the policy server 102. Notably, while polices are shown in the present example as being stored at the policy server 102, policies may be stored separately from the policy server 102 itself. For example, the policy store could be on a different machine from the policy server 102 or it could actually be inside a different policy server that can be contacted by the policy server 102. The request for metadata 120 may be a request that the policy server 102 provide metadata 106 regarding the policies stored at the policy store 104 at the policy server 102. The request 120 may be a general request which requests metadata 106 about any of the policies stored in the policy store 104. In an alternative embodiment, the request 120 may include information about policies already stored at the policy store 114 at the policy client 112 such that the request 120 only requests metadata 106 which includes differences between the policies at the policy store 114 at the policy client 112 and the policies stored at the policy store 104 of the policy server 102.

FIG. 1 illustrates that in response to the request for metadata 120, metadata 106 is returned to the policy client 112. Various embodiments may be implemented with differing scopes of the metadata 106 returned to the policy client 112. For example, in one embodiment, the metadata 106 may include information about all policies stored in the policy store 104 of the policy server 102. In an alternative embodiment, an administrator may specify a subset of policies stored in the policy store 104 about which the metadata 106 is sent to the policy client 112. This allows an administrator to control what policies are sent to the local machine 110. In some embodiments, the metadata 106 about policies stored at the policy store 104 may be determined based on characteristics of the local machine 110. For example, the metadata 106 may be determined based on the user of the local machine 110, the role of the user at the local machine 110, the location of the local machine 110, the operating system running on the local machine 110, the hardware configuration of the local machine 110, or any of a number of different factors.

Once the metadata 106 is received at the policy client 112, the policy client 112 can analyze the metadata 106 such as by comparing the metadata 106 to policies stored in the policy store 114 at the policy client 112. Based on the analysis of the metadata 106, policies at the policy store 114 of the policy client 112 are updated. Updating the policies of the policy store 114 may include one or more of a number of different activities. For example, in one instance, updating the policies at the policy store 114 may include obtaining new policies from the policy server 102 as will be explained in more detail below. In another instance, updating policies at the policy store 114 may include obtaining a different version of a policy from the policy server 102. In yet another instance, updating policies stored at the policy store 114 may include deleting one or more policies previously stored at the policy store 114.

Illustrating now an example of obtaining new policies or different versions of policies, the policy client may send a request 122 for policies from the policy server 102. The request 122 may be embodied in a number of different forms. For example, the request 122 may be may be a request for one, some, or all of the policies. The policy server 102, in response to the request 122, returns one or more policies 124 to the policy client 112. The policies 124 can then be stored in the policy store 114 at the policy client 112.

In the example illustrated in FIG. 1, once the policy client 112 has updated policies in the policy store 114, or has determined that no updates are needed, the policy client 112 may send a an indication 126 to the application 108 or to the task 118 as appropriate, indicating that the policy client has a current repository of policies.

The application 108 may then send a request for metadata 128 to the policy client 112. In response, the policy client sends metadata 130 to the application 108 where the metadata 130 includes information about policies stored at the policy store 114. The application 108 can then analyze the metadata 130 and determine that a request for policies is appropriate. The application 108 then sends a request 132 for policies 134. The policies 134 are then sent from the policy client 112 to the application 108.

Figure 2:
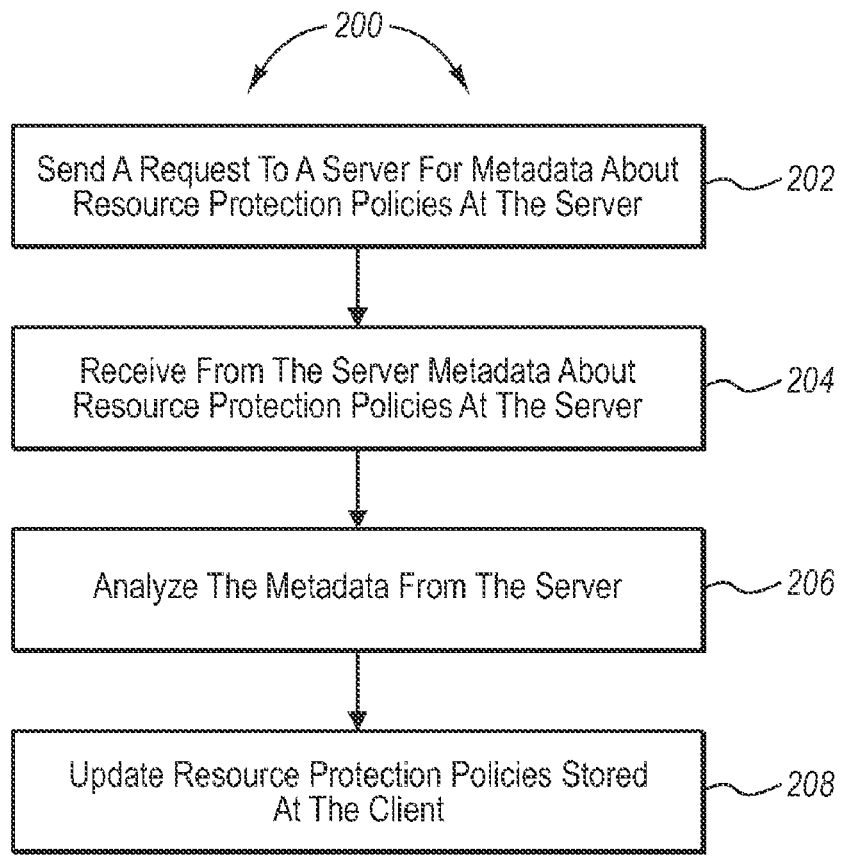
FIG. 2 illustrates a method of obtaining policy information.

Referring now to FIG. 2, a method 200 is illustrated. The method 200 may be practiced in a computing environment where resources are distributed, and includes acts for obtaining policy information defining restrictions on resources distributed in the computing environment. The method includes sending a request to a server for metadata about resource protection policies at the server (act 202). For example, as illustrated in FIG. 1, a request 120 is sent to the policy server 102 from the policy client 112. Notably, the server may function as a known location where a user can obtain policy information.

Sending a request to a server for metadata about resource protection policies at the server, in some embodiments is performed in response to receiving a request from a task. The task is configured to cause the client to obtain metadata about resource protection policies according to a predetermined schedule. For example, as illustrated in FIG. 1, a task 118 may be implemented to send a request 116 to the policy client 112 to direct the policy client 112 to send the request for metadata 120. Sending the request for metadata 120 could also be triggered by an event such as logging onto the machine 110, establishing network connectivity, etc. Additionally, in some embodiments, the policy client 112 includes functionality for synchronizing templates at the store 114 so that the store 114 on the policy client 112 is current.

Alternatively, for some embodiments as discussed previously herein, sending the request to a server for metadata about resource protection policies at the server is performed in response to receiving a request from an application requiring resource protection policies to access or protect a resource. For example, as illustrated in FIG. 1, the application 108 may send a request 116 to the policy client 112, which causes the policy client to send the request for metadata 120 and to synchronize templates at the store 114.

The client may include an application programming interface (API). The request to a server for metadata about resource protection policies at the server may be performed in response to receiving a request at the API. For example, the task 118 or application 108 may use the API to cause the policy client 112 to send the request 120.

In response to the request, metadata about resource protection polices at the server is received from the server (act 204). For example, as illustrated in FIG. 1, the metadata 106 is received from the policy server 102 at the policy client 112.

The method 200 further includes analyzing the metadata from the server (act 206). Based on analyzing the metadata, resource protection policies stored at the client are updated. Updating resource protection policies stored at the client may include a number of different activities. For example, in one embodiment updating resource protection policies includes obtaining a different version of a policy previously stored at the client from the server. For example, the policy client 112 may include a policy in the policy store 114. A different version of the policy may be stored at the policy store 104 at the policy server 102. As such, updating resource protection policies may include obtaining a new version of the policy stored at the policy store 114 from the policy store 104 at the policy server 102.

In an alternative embodiment, updating resource protection policies stored at the client may include obtaining a new policy not previously stored at the client from the server. For example, the policy server 102 may include policies stored at the policy store 104 which are not included in the policy store 114 at the policy client 112. Thus, updating resource protection policies may include obtaining policies from the policy store 104 at the policy server 102 and storing those policies at the policy store 114 at the policy client 112.

In yet another alternative embodiment, updating resource protection policies stored at the client may include deleting a policy previously stored at the client. For example, in one embodiment, the metadata 106 from the policy server 102 may specify that policies have been deleted from the policy store 104 of the policy server 102 or that policies should be otherwise removed from policy stores such as the policy store 114 at the policy client 112.

In the example above, when the application 108 causes the policy client 112 to send a request for metadata 120, the method 200 may further include providing an indication to the application that resource protection policies at the client have been updated. For example, the indication 126 may be sent from the policy client 112 to the application 108. In response to providing the indication 126 to the application that resource protection policies at the client have been updated, embodiments of the method 200 may include receiving a request 128 from the application for metadata 130 about resource protection policies at the client 112. In response to receiving a request from the application 108 for metadata 130 about resource protection policies at the client 112, the method 200 may include sending the metadata 130 to the application 108, the metadata including data about resource protection policies at the client 112.

In response to sending the metadata 130 to the application 108, the method 200 may include receiving a request 132 for resource protection policies 134 from the application 108. In response to receiving a request 132 for resource protection policies 134 from the application 108, the method 200 may include sending resource protection policies 134 to the application.

Figure 3:
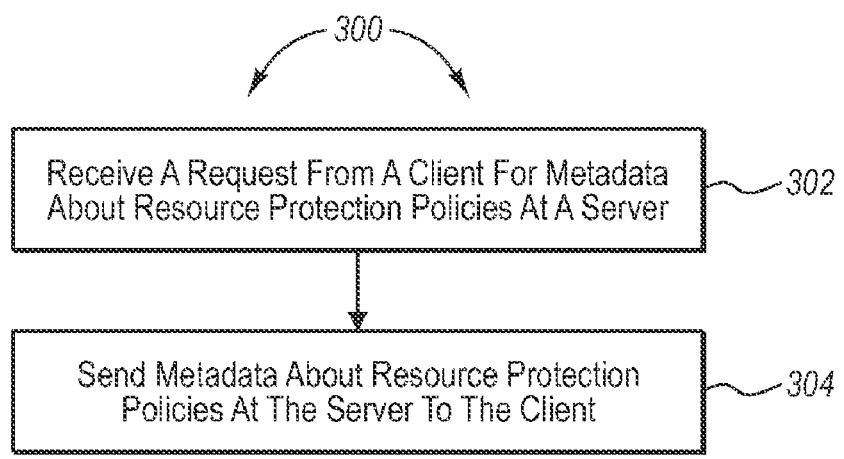
FIG. 3 illustrates a method of providing policy information.

Referring now to FIG. 3, another method 300 is illustrated. The method may be practiced, for example, in a computing environment where resources are distributed. The method 300 may include acts for providing policy information defining restrictions on resources distributed in the computing environment. The method includes receiving a request from a client for metadata about resource protection policies at a server (act 302). For example, the server 102 may receive a request for metadata 120 from the policy client 112. In response to the request for metadata about resource protection polices at the server, the method 300 further includes sending metadata about resource protection polices at the server to the client (act 304). For example, the server 102 may send metadata to the client 112.

Metadata about resource protection policies may be sent to the client based on a number of different factors. For example, metadata may be limited based on user identity information provided by the client, role information provided by the client, group membership information which may be provided by the client, by a directory, etc., physical location information provided by the client, administrator marked policies at the server, etc.

Figure 4:
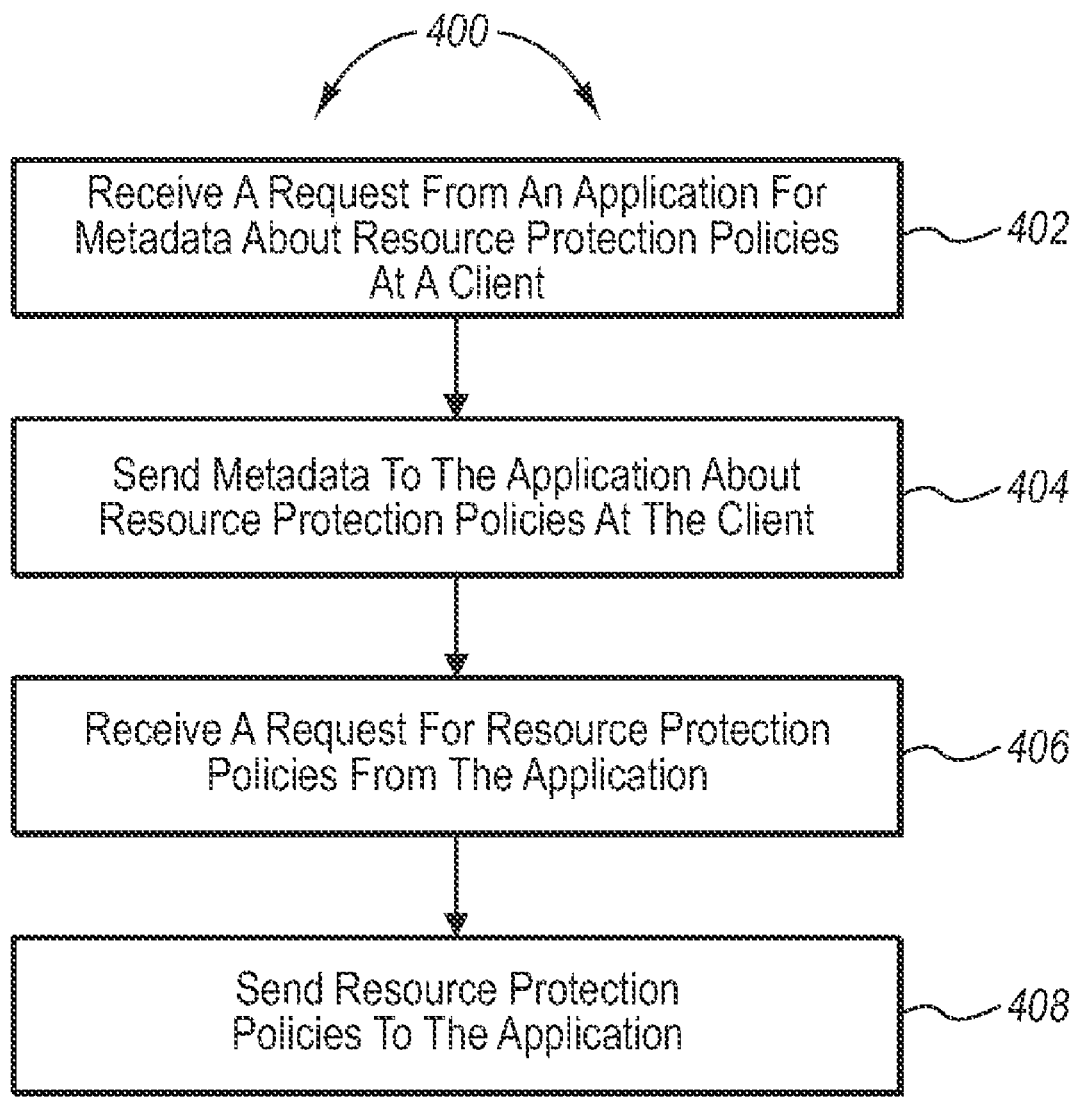
FIG. 4 illustrates another method of providing policy information.

Referring now to FIG. 4, a method 400 is illustrated. The method 400 may be practiced in a computing environment where resources are distributed. The method includes acts for obtaining policy information defining restrictions on resources distributed in the computing environment. The method includes receiving a request from an application for metadata about resource protection policies at a client (act 402). For example, the application 108 may send a request 128 to the policy client 112 for metadata 130 stored at the policy client.

In response to receiving a request from the application for metadata about resource protection policies at the client, the method 400 includes sending metadata to the application about resource protection policies at the client (act 404). For example, the policy client may send metadata 130 to the application 108.

In response to sending metadata to the application about resource protection policies at the client, the method 400 may include receiving a request for resource protection policies from the application (act 406). For example, the policy client 112 may receive the request 132 for resource protection policies.

In response to receiving a request for resource protection policies from the application, the method 400 may include sending resource protection policies to the application (act 408). For example, the policy client 112 may send one or more resource protection policies 134 to the application 108.

Embodiments herein may comprise a special purpose or general-purpose computer including various computer hardware, as discussed in greater detail below.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment where resources are distributed, a method of obtaining policy information defining restrictions on resources distributed in the computing environment, the method comprising:

sending a request to a server for metadata about resource protection policies at the server;

in response to the request, receiving from the server metadata about one or more resource protection polices at the server;

analyzing the metadata from the server;

based on analyzing the metadata, updating one or more resource protection policies stored at the client;

providing an indication to an application that one or more resource protection policies at the client have been updated; and in response to providing an indication to the application that one or more resource protection policies at the client have been updated, receiving a request from the application for metadata about resource protection policies at the client.

2. The method of claim 1, wherein updating one or more resource protection policies stored at the client comprises obtaining a different version of a policy previously stored at the client from the server.

3. The method of claim 1, wherein updating resource protection policies stored at the client comprises obtaining a new policy not previously stored at the client from the server.

4. The method of claim 1, wherein updating one or more resource protection policies stored at the client comprises deleting a policy previously stored at the client.

5. The method of claim 1, wherein the server functions as a known location where a user can obtain policy information.

6. The method of claim 1, wherein sending a request to a server for metadata about resource protection policies at the server is performed in response to receiving a request from a task, wherein the task is configured to cause the client to obtain metadata about resource protection policies according to a predetermined schedule.

7. The method of claim 6, wherein the predetermined schedule comprises a predetermined interval.

8. The method of claim 1, wherein sending a request to a server for metadata about resource protection policies at the server is performed in response to receiving a request from the application requiring one or more resource protection policies to access a resource.

9. The method of claim 8, further comprising:

in response to receiving a request from the application for metadata about resource protection policies at the client, sending metadata to the application about resource protection policies at the client;

in response to sending metadata to the application about resource protection policies at the client, receiving a request for one or more resource protection policies from the application; and in response to receiving a request for one or more resource protection policies from the application sending one or more resource protection policies to the application.

10. The method of claim 1, wherein the client comprises an application programming interface (API), and wherein the request to a server for metadata about resource protection policies at the server is performed in response to receiving a request at the API.

11. In a computing environment where resources are distributed, a method of providing policy information defining restrictions on resources distributed in the computing environment, the method comprising:

receiving a first request from a client for metadata about resource protection policies at a server;

in response to the request for metadata about resource protection polices at the server, sending metadata about one or more resource protection polices at the server to the client;

in response to sending metadata about resource protection polices at the server to the client, receiving a second request for one or more policies stored at the server; and in response to receiving the second request for one or more policies stored at the server, sending the one or more policies to the client, which thereby causes an update of a policy store of the client to be updated as well as notification to be provided to an application of the client that the policy store of the client has been updated.

12. The method of claim 11, wherein metadata about resource protection policies are sent to the client based on user identity information provided by the client.

13. The method of claim 11, wherein metadata about resource protection policies are sent to the client based on role information provided by the client.

14. The method of claim 11, wherein metadata about resource protection policies are sent to the client based on group membership information.

15. The method of claim 11, wherein metadata about resource protection policies are sent to the client based on physical location information provided by the client.

16. The method of claim 11, wherein metadata about resource protection policies are sent to the client based on administrator marked policies at the server.

17. The method of claim 11, wherein the notification causes the application to request metadata from the client regarding the update.

18. In a computing environment where resources are distributed, a method of providing policy information defining restrictions on resources distributed in the computing environment, the method comprising:

a client providing an indication to an application that one or more resource protection policies at the client have been updated;

receiving a request from an application for metadata about one or more resource protection policies at a client, which is provided from application in response to the indication to the application that the one or more resource protection policies at the client have been updated;

in response to receiving a request from the application for metadata about one or more resource protection policies at the client that have been updated, sending metadata to the application about one or more resource protection policies at the client that have been updated;

in response to sending metadata to the application about one or more resource protection policies at the client that have been updated, receiving a request for the one or more resource protection policies from the application; and in response to receiving the request for the one or more resource protection policies from the application, sending the one or more resource protection policies to the application.

19. The method of claim 18, wherein providing an indication to the application that the one or more resource protection policies at the client have been updated is performed in response to a request from an application or task sent to the client.

* * * * *